United States Patent
Seshadri et al.

(10) Patent No.: US 9,071,660 B1
(45) Date of Patent: Jun. 30, 2015

(54) SYSTEM AND METHOD FOR POC SESSION SUBSTITUTION

(75) Inventors: Thirumalai Echampadi Seshadri, Bangalore (IN); Venkateswar Jeedigunta, Bangalore (IN); Sung-Jin Park, Suwon-si (KR); Sang-Kyung Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/916,160

(22) PCT Filed: Jun. 2, 2006

(86) PCT No.: PCT/KR2006/002131
§ 371 (c)(1),
(2), (4) Date: Nov. 17, 2009

(87) PCT Pub. No.: WO2006/129984
PCT Pub. Date: Dec. 7, 2006

(30) Foreign Application Priority Data

Jun. 2, 2005 (IN) .............................. 675/CHE/2005
Jun. 1, 2006 (KR) .............................. 10-2006-49580

(51) Int. Cl.
*G06F 15/16* (2006.01)
*H04L 29/06* (2006.01)
*H04W 76/00* (2009.01)

(52) U.S. Cl.
CPC ......... *H04L 65/4061* (2013.01); *H04W 76/005* (2013.01)

(58) Field of Classification Search
CPC .............. H04L 12/189; H04L 65/1006; H04L 65/1016; H04L 65/4061; H04W 4/10; H04W 76/005
USPC ........................................................ 709/228
See application file for complete search history.

(56) References Cited

U.S. PATENT DOCUMENTS

| | | | |
|---|---|---|---|
| 5,828,845 A * | 10/1998 | Jagadish et al. .............. | 709/229 |
| 6,014,549 A * | 1/2000 | Foladare et al. ............. | 340/7.21 |
| 6,058,307 A | 5/2000 | Garner | |
| 6,982,961 B2 | 1/2006 | Refai et al. | |
| 7,343,153 B1 | 3/2008 | Kauhanen et al. | |
| 2002/0146005 A1 * | 10/2002 | Gallant et al. ................ | 370/389 |
| 2003/0016632 A1 | 1/2003 | Refai et al. | |
| 2003/0072319 A1 * | 4/2003 | Pedersen ....................... | 370/431 |
| 2004/0114030 A1 | 6/2004 | Ohkawa et al. | |
| 2004/0120474 A1 | 6/2004 | Lopponen | |
| 2005/0186970 A1 * | 8/2005 | Yates et al. ................. | 455/456.5 |
| 2006/0075029 A1 * | 4/2006 | Kelso et al. .................. | 709/206 |

FOREIGN PATENT DOCUMENTS

| | | |
|---|---|---|
| CN | 1533678 A | 9/2004 |
| JP | 2003-242057 A | 8/2003 |
| JP | 2004-096791 A | 3/2004 |
| JP | 2004-146913 A | 5/2004 |
| JP | 2005-006148 A | 1/2005 |
| JP | 2005-110302 A | 4/2005 |
| WO | WO 2006009367 A1 | 1/2006 |

\* cited by examiner

*Primary Examiner* — Christopher Biagini
(74) *Attorney, Agent, or Firm* — Jefferson IP Law, LLP

(57) ABSTRACT

The present invention provides a method in which when receiving an invitation request to a new PoC session, a PoC client participating in multiple sessions for which a maximum limit is set determines whether it is now participating in the maximum number of sessions, the PoC client notifies a user that the maximum number of sessions are used if the maximum limit is reached, and releases one of an existing session or the last requested session according to user selection.

10 Claims, 5 Drawing Sheets

Fig. 4

```
xmlns="urn:oma:params:xml:ns:poc:poc-settings"
xmlns:xs="http://www.w3.org/2001/XMLSchema"
elementFormDefault="qualified"
attributeFormDefault= unqualified">
<xs:import namespace="http://www.w3.org/XML/1998/namespace"
        schemaLocation="http://www.w3.org/2001/xml.xsd'/>
<xs:annotation>
   <xs:documentation xml:lang="en >
     XML Schema Definition in support of the Incoming Session
     Barring, Answer Mode, and Incoming Personal Alert Barring
     in the Push-to-talk over Cellular (PoC) service.
   </xs:documentation>
</xs:annotation>
<xs:element name="poc-settings" type="poc-settingsType"/>
<xs:complexType name='poc-settingsType">
   <xs:sequence>
     <xs:element name="isb-settings' type="isbSettingType"
                minOccurs="0" maxOccurs="unbounded"/>
     <xs:element name="am-settings' type="amSettingType"
                minOccurs="0" maxOccurs="unbounded"/>
     <xs:element name="ipab-settings" type="ipabSettingType"
                minOccurs="0' maxOccurs="unbounded"/>
     <xs:any namespace="##other" processContents="lax" minOccurs="0"
                           maxOccurs="unbounded"/>
     <xs:element name="multi-session-management">
        <xs:simpleType>
           <xs:restriction base="xs:string">
              <xs:enumeration value="automatic" />       ~400
              <xs:enumeration value="manual" />
           </xs:restriction>
        </xs:simpleType>
     </xs:element>
   </xs:sequence>
   <xs:anyAttribute namespace="##other"/>
</xs:complexType>
<xs:complexType name= isbSettingType">
  <xs:sequence>
     <xs:element name="incoming-session-barring >
        <xs:complexType>
           <xs:attribute name="active" type="xs:boolean"
                     use="required" />
        </xs:complexType>
     </xs:element>
     <xs:any namespace="##other' processContents="lax"
           minOccurs="0" maxOccurs="unbounded"/>
  </xs:sequence>
  <xs:anyAttribute namespace="##other />
</xs:complexType>
```

Fig. 5

```
<xs:complexType name="amSettingType">
    <xs:sequence>
        <xs:element name="answer-mode" >
            <xs:simpleType>
                <xs:restriction base="xs:string">
                    <xs:enumeration value="automatic"/>
                    <xs:enumeration value="manual"/>
                </xs:restriction>
            </xs:simpleType>
        </xs:element>
        <xs:any namespace="##other" processContents="lax"
                minOccurs="0" maxOccurs="unbounded"/>
    </xs:sequence>
    <xs:anyAttribute namespace="##other"/>
</xs:complexType>

<xs:complexType name="ipabSettingType">
    <xs:sequence>
        <xs:element name="incoming-personal-alert-barring">
            <xs:complexType>
                <xs:attribute name="active" type="xs:boolean"
                              user="required" />
            </xs:complexType>
        </xs:element>
        <xs:any namespace="##other" processContents="lax"
                minOccurs="0" maxOccurs="unbounded"/>
    </xs:sequence>
    <xs:anyAttribute namespace="##other"/>
</xs:complexType>

</xs:schema>
```

SYSTEM AND METHOD FOR POC SESSION SUBSTITUTION

TECHNICAL FIELD

The present invention relates to a technology for supporting a simultaneous session handling procedures in a PoC (Push to Talk Over Cellular) system.

BACKGROUND ART

A PoC System makes use of the infrastructure provided by SIP technology for session establishment, session management and session termination. While providing multiple sessions, it is understandable the number of simultaneous sessions cannot be indefinite considering the limited resources available.

In the PoC system, multiple sessions are managed in a PoC server or in a PoC client. These two cases will be described with reference to FIGS. 1 and 2.

With reference to FIG. 1, a description will first be made of a PoC simultaneous session scenario at a PoC server. FIG. 1 illustrates a scenario describing a server behavior when the number of simultaneous PoC sessions has exceeded the limit.

In FIG. 1, it is assumed that User A wants to invite User B for joining a PoC session, User B has involved in multiple PoC Sessions, he has reached the maximum limit that has been supported, and the PF of User B supports the simultaneous sessions. Hereinbelow, the terms PoC user and PoC client will be used interchangeably in the same sense.

Referring to FIG. 1, when User A wants to invite User B to join a PoC conversation, he sends an INVITE message addressing User B. A controlling PoC Function (hereinafter, referred to as CF) B routes the INVITE message to a participating function via an SIP signaling procedure in steps 100 to 104. PF B receives the INVITE message, and checks whether User B has reached his maximum limit for the simultaneous sessions in step 106. If User B has already reached the maximum limit of the simultaneous PoC sessions, PF B replies to the INVITE message with a '486 Busy' message in steps 108 to 112. PF B keeps on replying with the busy state notification till User B has released at least one of the existing PoC sessions.

As described above, when User A invites User B to join a PoC session in the PoC simultaneous session scenario at the PoC server, Participating PoC Function (hereinafter, referred to as PF) B determines the availability of User B before routing the invitation request. If PF B recognizes that User B is "participating in the maximum number of simultaneous sessions", it sends the 486 Busy message to CP B. Then CF B determines User B as busy and responds back to User A automatically.

With reference to FIG. 2, a PoC simultaneous session scenario at a PoC client will be described. FIG. 2 illustrates a scenario describing a client behavior when the number of simultaneous PoC sessions has exceeded the limit.

Referring to FIG. 2, it is assumed that User A wants to invite User B for joining a PoC session, User B has involved in multiple PoC Sessions, he has reached the maximum limit that has been supported, and the PF of User B supports the simultaneous sessions, as with FIG. 1.

When User A wants to invite User B to join a PoC conversation, he sends an INVITE message addressing User B. Controlling PoC Function (hereinafter, referred to as CF) B routes the INVITE message to the PF via an SIP signaling procedure in steps 200 to 204. PF B routes the INVITE message to User B in steps 206 and 208. PoC client B checks the allowed maximum number of PoC sessions in step 210. If User B has already reached the maximum limit of the simultaneous PoC sessions, PoC client B replies to the INVITE message with a "REJECT" message in steps 212 to 220. PoC client B keeps on replying with the busy state notification till User B has released at least one of the existing PoC sessions.

As described above, when User A invites User B to join a PoC session in the PoC simultaneous session scenario at the PoC client, the PF routes the INVITE message to User B. Then if the requesting PF client recognizes that User B is "too busy for the simultaneous session", the PF responds back to User A automatically. Alternatively, the PF responds to User A that User B is busy, directly without routing the INVITE message to User B.

DISCLOSURE OF INVENTION

Technical Problem

As described above, if a PoC client participating in multiple sessions is requested to join a session, a PoC server determines the PoC client as busy if the PoC client has reaches the maximum limit of simultaneous sessions that can be joined at one time. Then the PoC server notifies the inviting user that the recipient user cannot join.

The invited session may be more important than the existing session for the PoC client. In this case, if the user are participating the maximum number of sessions, the PoC server may decide that the PoC client is busy without giving any right to select the session to the PoC client. Due to this limit of the session selection right, the PoC user may miss the more important invited PoC session.

Technical Solution

Accordingly, the present invention provides a system and method for PoC session substitution in order to provide more flexibility to an end user during participating in multiple sessions through an improved session management mechanism.

The present invention provides a system and method for substituting an incoming PoC session for one of existing PoC sessions so that the limit for simultaneous sessions is met.

The present invention provides a PoC session substitution system and method for determining whether to accept or reject an incoming PoC session invitation by a user in a simultaneous session situation where the number of PoC sessions involved at a time exceeds a maximum limit.

The present invention provides a PoC session substitution system and method for managing simultaneous sessions when the number of the simultaneous sessions exceeds a maximum limit.

The present invention provides a PoC session substitution system and method for managing multiple sessions by updating in a PoC service environment.

The present invention provides a PoC session substitution system and method for routing an INVITE message by a server in a PoC service environment.

The present invention provides a system and method for maintaining a timer in a PoC server when the PoC server receives an invitation acceptance before release of an existing session.

The present invention provides a system and method for substituting a PoC session by a client upon receipt of a new invite request.

To achieve the above objects, in a PoC session substitution system, upon receipt of a session invitation request to a PoC client, a PoC server checks a multiple session management setting in a PoC service environment set by the PoC client, and routes the session invitation request to the PoC client if the multiple session management setting is set to manual. Upon receipt of the session invitation request, the PoC client determines whether the PoC client is participating in all available sessions, notifies a user that the number of sessions participated has reached a maximum limit, if all available sessions are used, and selects of at least one of an invited session and an existing session.

To achieve the above objects, in a method of managing multiple sessions which a PoC client is participating in, when an invitation request to a new session is received for the PoC client, a PoC server checks a multiple session management setting in a PoC client-set PoC service environment, and routes the session invitation request to the PoC client by the PoC server, if the multiple session management setting is set to manual. The PoC client determines whether the PoC client is participating in all available sessions, upon receipt of the session invitation request by the PoC client, notifies a user that the number of sessions participated has reached a maximum limit by the PoC client, if all available sessions are used, and selects at least one of an invited session and an existing session.

Advantageous Effects

As described above, the present invention advantageously enables a user to determine whether to accept or reject an incoming PoC session invitation when the invitation request arrives at a client participating in multiple sessions the number of which exceeds an allowed maximum limit.

BRIEF DESCRIPTION OF THE DRAWINGS

FIGS. 4 and 5 illustrate a schema for PoC service environment setting to manage multiple sessions according to an embodiment of the present invention.

BEST MODE FOR CARRYING OUT THE INVENTION

When a PoC client participating in multiple sessions receives an invitation request, its user checks an invited session and has to set a PoC service environment in order to release one of an existing session or the last requested session.

Referring to FIGS. 4 and 5 illustrating a schema for PoC service environment setting to manage multiple sessions, the PoC user may specify his preference via PoC service settings using XML in a box 400, whether he would like to receive an incoming invitation, once the maximum limit has reached. A multiple session management value can be set to "automatic" or "manual". If the multiple session management value is set to automatic, a server itself rejects the invitation and interprets a terminating PoC client as "Busy". This is considered as a default value. If the multiple session management value is set to manual, the server routes the INVITE message to the PoC client and manages the PoC sessions in the manner that maintains the maximum simultaneous session limit.

According to the multiple session management setting, the server decides whether it has to reject or route the INVITE message to the user. When the invited client is participating in the maximum number of sessions, the server checks the service environment. This can be achieved through an existing PoC setting publish procedure.

Figure 1:
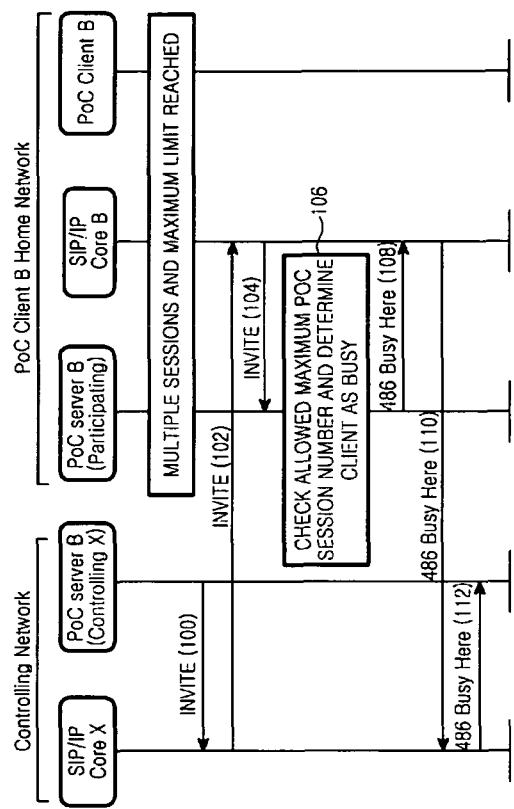
FIG. 1 illustrates a scenario describing a server behavior when the number of simultaneous PoC sessions has exceeded the limit.
Figure 2:
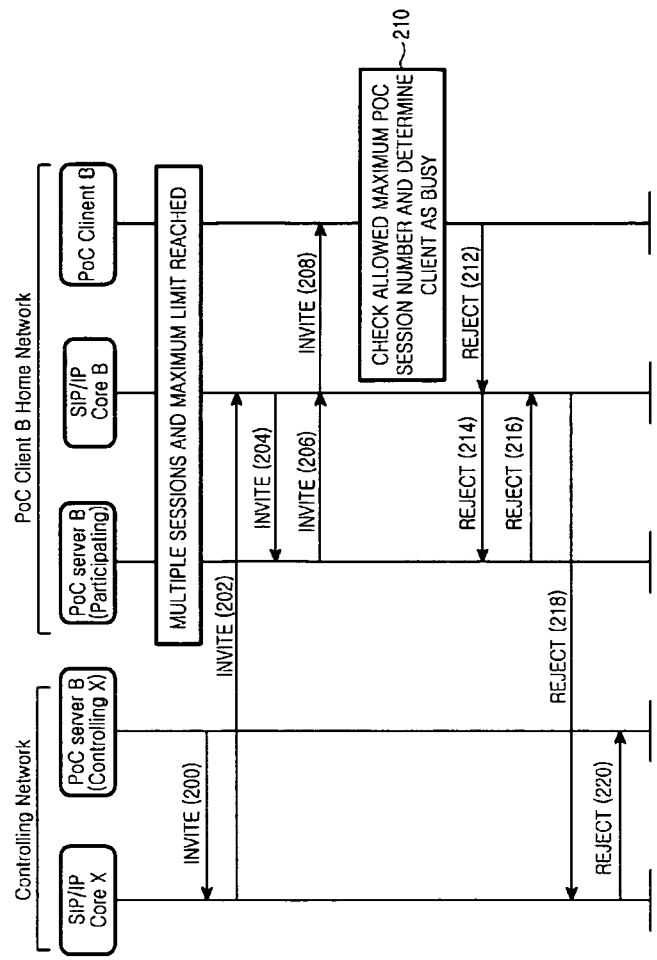
FIG. 2 illustrates a scenario describing a client behavior when the number of simultaneous PoC sessions has exceeded the limit.
Figure 3:
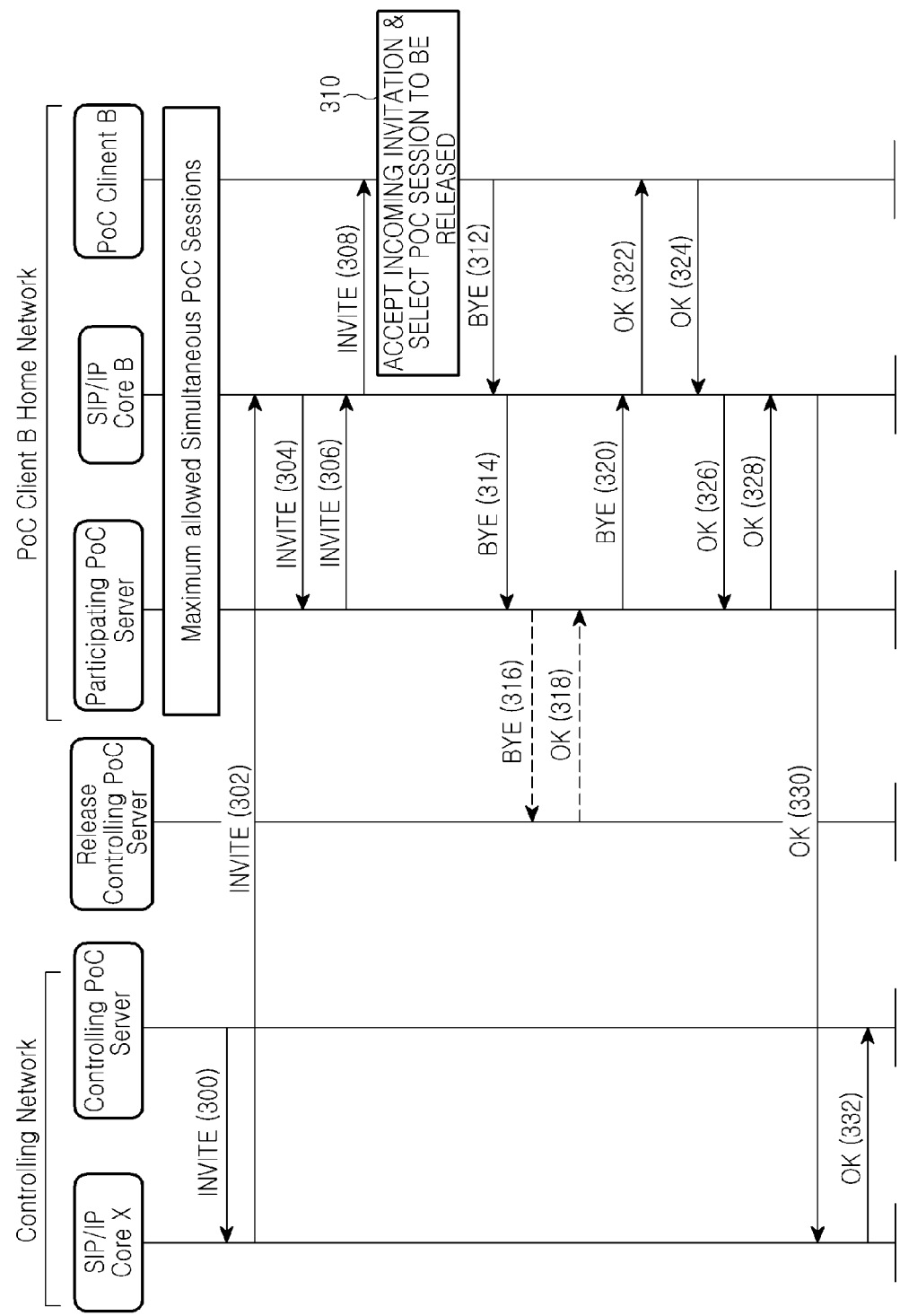
FIG. 3 illustrates a scenario describing a behavior proposed when the number of simultaneous PoC sessions has exceeded the limit according to an embodiment of the present invention.

With reference to FIG. 3, a description will be made of a signal flow and operation between a PoC server and a PoC client participating in multiple sessions, upon receipt of an invitation request for the PoC client in the case where a PoC service environment has been set for multiple session management. FIG. 3 illustrates a scenario describing a behavior proposed when the number of simultaneous PoC sessions has exceeded the limit according to an embodiment of the present invention.

The PoC client has the provision to specify service settings related to multiple session management, when it supports multiple sessions. The PoC server has the provision to update the service settings related to multiple session management, when it supports multiple sessions.

Upon receipt of an INVITE message in steps 300 to 304, it determines whether a multiple session management value is set to automatic or manual. If it is set to automatic, the PoC server itself rejects the invitation, determines a terminating PoC client as busy, and notifies the requesting client of the fact by a 'Busy' message.

If the multiple session management value is set to manual, the PoC server routes the INVITE message to PoC Client B in steps 306 and 308.

In step 310, PoC client B checks its allowed maximum number of PoC sessions and notifies its user of the incoming session invitation request. In the case where the number of PoC sessions has reached the maximum limit, upon receipt of a user request for participating in the new session instead of an existing PoC session, PoC Client B notifies the participating PoC server that one of the existing PoC sessions will be released by sending a BYE message in steps 312 and 314. When needed, one or more PoC sessions may be released. The BYE message contains the ID of a PoC session to be released. The ID can be a conference URI, SIP URI, or an index as far as it identifies the PoC session. The participating PoC server notifies a corresponding controlling PoC server of release of the PoC session using the PoC session ID by sending the BYE message. A controlling PoC server which has not received the BYE message maintains the PoC session, while the controlling PoC server receiving the BYE message notifies PoC Client B of release of the PoC session by an OK message in steps 318 to 322. Then PoC Client B sends the OK message to the controlling PoC server that has sent the INVITE message, notifying that it has joined the session in step 324 to 332.

The participating PoC server may invoke a timer to receive a time to receive the BYE message. If the BYE message is not received before the timer expiry, the PoC server determines that the invited PoC Client B will not participate in the session and sends a Busy message to the requesting client. For an incoming message after the time expiry, the PoC server sends a message indicating the time expiry (e.g. Not acceptable).

If the PoC service environment for multiple session management is not set, the procedure is affected according to the answer mode of the PoC client. If the answer mode is a manual answer mode, the multiple session management is carried out as if the multiple session management value were set to manual. If the answer mode is an auto answer mode, the PoC server sends an INVITE message commanding negligence of auto answer setting of PoC Client B to PoC Client B in step 306 and 308. The subsequence procedure is performed in the same manner as described before.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A Push-to-talk over Cellular (PoC) server for PoC session substitution in a PoC system, the PoC server comprising:
at least one hardware processor that checks a multiple session management setting in a PoC service environment, set by a PoC client, upon receipt of a PoC session invitation request to the PoC client and that routes the PoC session invitation request to the PoC client if a number of existing PoC sessions of the PoC client is at a maximum limit and the multiple session management setting is set to manual,
wherein the PoC client releases at least one of the existing PoC sessions or the invited PoC session in response to the PoC session invitation request according to a user's request, if the number of existing PoC sessions is at the maximum limit and the multiple session management setting in the PoC environment is set to manual,
wherein the maximum limit is greater than or equal to two, and
wherein the client is engaged in the maximum limit of existing PoC sessions when the PoC session invitation request is received.

2. The PoC server of claim 1, wherein if the multiple session management setting in the PoC service environment is set to automatic, the at least one hardware processor determines that the PoC client is busy and sends a reject message for the PoC session invitation request to the a client which has sent the PoC session invitation request.

3. The PoC server of claim 1, wherein upon receipt of a message for releasing at least one of existing PoC sessions or the invited PoC session from the PoC client, the at least one hardware processor checks the PoC session to be released included in the message and releases the at least one of existing PoC sessions or the invited PoC session as indicted in the message.

4. The PoC server of claim 1, wherein upon receipt of the response message indicating acceptance of the PoC session invitation request from the PoC client, the at least one hardware processor establishes the invited PoC session.

5. The PoC server of claim 1, wherein if the multiple session management setting in the PoC environment is set to manual, the at least one hardware processor invokes a timer for receiving the message for releasing a PoC session from the PoC client, after routing the PoC session invitation request to the PoC client, determines that the PoC client is busy if the message for the PoC session release is not received from the PoC client before the timer expires, and sends a reject message to the client which sent the PoC session invitation request.

6. A method of managing multiple sessions which a Push-to-talk over Cellular (PoC) client is participating in, when a PoC invitation request to a new PoC session is received for the PoC client, in a PoC server, the method comprising:
checking a multiple session management setting in a PoC service environment set by a PoC client; and
routing the PoC session invitation request to the PoC client if a number of existing PoC sessions of the PoC client is at a maximum limit and the multiple session management setting in the PoC service environment is set to manual,
wherein the PoC client releases at least one of the existing PoC sessions or the invited PoC session in response to the PoC session invitation request according to a user's request, if the multiple session management setting in the PoC environment is set to manual,
wherein the maximum limit is greater than or equal to two, and
wherein the client is engaged in the maximum limit of existing PoC sessions when the PoC session invitation request is received.

7. The method of claim 6, further comprising determining that the PoC client is busy and sends a reject message for the PoC session invitation request to a client which sent the PoC session invitation request, if the multiple session management setting in the PoC environment is set to automatic.

8. The method of claim 6, further comprising checking the PoC session to be released in the message and releasing the PoC session to be released, upon receipt of the message for releasing at least one of existing PoC sessions or the invited PoC session from the PoC client.

9. The method of claim 6, further comprising establishing the invited PoC session, upon receipt of the response message indicating acceptance of the PoC session invitation request from the PoC client.

10. The method of claim 6, further comprising:
invoking a timer for receiving a message for releasing a PoC session from the PoC client after routing the PoC session invitation request to the PoC client, if the multiple session management setting in the PoC environment is set to manual; and
determining that the PoC client is busy if the message for the PoC session release is not received from the PoC client before the timer expires, and sending a reject message to the client which sent the PoC session invitation request.

* * * * *